Dec. 14, 1965  H. L. GROGINSKY  3,223,999
RESOLUTION IMPROVEMENT DEVICES
Filed Oct. 1, 1962  4 Sheets-Sheet 1

INVENTOR
HERBERT L. GROGINSKY
BY Herbert W. Arnold
ATTORNEY

Dec. 14, 1965 H. L. GROGINSKY 3,223,999
RESOLUTION IMPROVEMENT DEVICES
Filed Oct. 1, 1962 4 Sheets-Sheet 2

INVENTOR
HERBERT L. GROGINSKY
BY Herbert W. Arnold
ATTORNEY

FIG. 5

Dec. 14, 1965  H. L. GROGINSKY  3,223,999
RESOLUTION IMPROVEMENT DEVICES
Filed Oct. 1, 1962  4 Sheets-Sheet 4

FIG. 6

INVENTOR
HERBERT L. GROGINSKY
BY Herbert W. Arnold
ATTORNEY

United States Patent Office 3,223,999
Patented Dec. 14, 1965

3,223,999
RESOLUTION IMPROVEMENT DEVICES
Herbert L. Groginsky, Sudbury, Mass., assignor to Raytheon Company, Lexington, Mass., a corporation of Delaware
Filed Oct. 1, 1962, Ser. No. 227,273
7 Claims. (Cl. 343—17.1)

This invention relates to resolution improvement devices, and more particularly to a resolution improvement device which maximizes the hash ratio or peak signal to peak spurious output for a given desired resolution improvement.

Resolution describes the ability to distinguish two or more objects from one another in the field of view of a given sensor. In general, this means that two distinct objects viewed by the sensor must be displayed as two distinct peaks well separated by a relatively low amplitude between them. The sensor may be, for example, a radar or sonar receiver and the closely spaced objects may be, for example, echo returns from targets of interest closely spaced in range or azimuth. The purpose of resolution improvement would then be to narrow the width of the sensor output from individual echo returns so that a radar or sonar display operator could distinguish between the two return signals and observe that they represented two distinct objects. Alternatively, resolution might be desired to enable an operator to distinguish between a target of interest and background clutter by exercising pattern recognition, in which case it is also necessary to provide the operator with a high definition or resolution picture over a fairly extended field of view.

Accordingly, this invention provides apparatus which can be used in conjunction with a variety of sensors to yield a high definition picture. Resolution improvement is accomplished by coupling the output of a given linear sensor, whose output waveform or impulse response is known, to a series of linear time delay devices having provision for time delaying an input signal a predetermined amount. Suitable devices are electromagnetic delay lines, such as the lumped constant or distributed type magnetic storage media and storage tube devices. The outputs from the delay device are coupled to a combining circuit by tapping means which may be, for example, a tape head in the case of a magnetic tape delay device or the output transducer in the case of a magnetostrictive device. Each tap is suitably weighted as, for example, by a resistive element according to a predetermined plan established by the known sensor impulse response characteristics and the desired resolution improvement and hash ratio. In addition to the assignment of a weighting value for each delay period, the outputs are also combined in a certain polarity by coupling some of the tap outputs to a phase inverter prior to summing all the outputs in a summing circuit. The time delay, weighting values and polarity of combination are such that the energy output from the sensor is redistributed over a narrower area. Thus, a relatively long duration signal is converted to a short duration signal, as, for example, a 2 microsecond rectangular pulse output from the sensor is converted to a .25 microsecond peak pulse output from the resolution improvement device. In the example given, the resolution improvement, RI, would equal the ratio of the sensor response width, 2 microseconds, to the over-all system response width; .25 microsecond. A resolution improvement of 8:1 is thereby realized.

Comparable prior art devices for enhancing the output of a sensor consist mainly of the class of structures designated as matched filters which maximize the ratio of the peak output signal to R.M.S. noise. In a matched filter, the weighting function or value of resistive elements applied to the delay device taps has the form of the sensor signal run backward through the filter. By definition then, the matched filter must have a minimum total time delay equal to the input pulse width. Reference is had to the text Random Signals and Noise, by Davenport and Root, page 246, for a discussion of matched filters. Although the matched filter technique achieves maximum signal to noise ratio, the resultant system response width is determined by the impulse response width of the sensor. Thus, for example, in the case of a rectangular pulse sensor output the resultant matched filter output would be a stepped triangular pulse shaped function. This type of function would not satisfy the aforesaid objective of resolution improvement because the triangular wave shape does not have a distinctive peak well separated from the low amplitude hash or side-lobe component. Accordingly, it is a feature of this invention to provide a filter which will yield an arbitrarily narrow peak output pulse characterized by relatively low side-lobe levels at some sacrifice in signal to noise ratio from what would be obtained using a matched filter and having a total time delay greater than the input pulse width.

It is a further feature of this invention that improved resolution of the sensed pulse or echo is obtained without the need for special coding as by frequency modulation of the transmitted pulse. This feature enables an embodiment of the invention to be added to existing conventional radar or sonar apparatus to improve range resolution without extensive modification of the transmitter section of the apparatus.

Before proceeding to a description of a particular embodiment of the present invention it may be helpful at this point to relate the mathematical concepts upon which the selection of a suitable filter or delay line network for resolution improvement is based.

The general problem of predetermining the optimum tap weighting value or polarity and proportion of the sample tapped at each delay point to obtain resolution improvement of a sensor output can be stated mathemaically as follows: Given a time limited bounded input $x(t)$, corresponding to the sensor output, whose epoch is zero, find a physically realizable linear operator $h(t)$, corresponding to the delay line network, with the property that its output:

$$y(t) = \int_0^t h(\tau) x(t-\tau) d\tau$$

is such that $y(t)$ is maximized over a small interval $|t-t_0| \leq \Delta$, subject to the constraint that the magnitude of all other $y(t)$'s outside that interval is less than or equal to unity. Or:

$$|y(T)| \leq 1 \text{ for } |t-t_0| > \Delta$$

Where:
$\Delta$ is the desired output pulse width,
$T$ is real time,
$\tau$ is a dummy variable,
$y(t)$ is the filter output,
$h(\tau)$ is the impulse response of the filter,
$x(t)$ is the filter input,
and the symbol $|\ |$ indicates that only the magnitude of the quantities within the symbol is being considered.

Further restricting the problem to a sampled data analog of the above quantities $y(t)$, $h(t)$ and $x(t)$ by considering outputs only at sample intervals and relying on the limited bandwidth of the over-all system to prevent large discrepancies from the predetermined conditions in the intersample interval, allows the input data $y(t)$ above to be replaced by the finite sequence of data points:

$$x = \begin{bmatrix} x_1 \\ \cdot \\ \cdot \\ \cdot \\ x_M \end{bmatrix} = \begin{bmatrix} x(O) \\ x(T) \\ \cdot \\ \cdot \\ x[(M-1)T] \end{bmatrix}$$

Equation 1

Where $x_1$ is the sample or value of $x(t)$ at the first sample point; $x_M$ is the sample of $x$ at the $M$th sample point; T is the sampling interval; M is the total number of sample points; and the symbol [ ] denotes the matrix of the quantities with the symbol.

Furthemore, the linear operator or delay line network can similarly be represented as a finite sequence of data points. Thus:

$$h = \begin{bmatrix} h_1 \\ \cdot \\ \cdot \\ \cdot \\ h_N \end{bmatrix} = \begin{bmatrix} h(O) \\ h(T) \\ \cdot \\ \cdot \\ h[(N-1)T] \end{bmatrix}$$

Equation 2 where $h_1$ is the first tap weighting coefficient; $h_N$ is the $N$th tap weighting coefficient; and N is the total number of taps on the delay line.

The output of the delay line network is then:

$$Y_n = \sum_{k=1}^{N} h_k x_{n-k+1}$$

Equation 3

Where $x_j = 0$ for $j \leq 0$ and $j > m$, and $j = n - k$; $y_n$ is $n$th sampled output and $h_k$ is the value of the $K$th tap.

There are at most $M+N-1$ outputs which are different than zero. If the delay time, $t_0$, or the point at which it is desired to have maximum peak signal is chosen to correspond to the center of the delay line, Equation 3 can be simplified. Thus, by setting $$t_0 = \frac{N}{2} T$$

and letting $$p = \left| \frac{N}{2} \right|$$

be the greatest integer less than or equal to $$\left| \frac{N}{2} \right|$$

and excluding $y_p$ from the vector, $y$ can be defined as follows:

$$y = \begin{bmatrix} y_1 \\ \cdot \\ \cdot \\ \cdot \\ y_{p-1} \\ y_{p+1} \\ \cdot \\ \cdot \\ \cdot \\ y_{M+N-1} \end{bmatrix}$$

Equation 4 and the problem then becomes, find $h$ such that:

$$y_D = \sum_{k=1}^{n} h_k x_{D-k+1} = \text{maximum}$$

Equation 5 subject to the constraints that:

$$|y| = \begin{bmatrix} |y_1| \\ \cdot \\ \cdot \\ |y_{M+N-1}| \end{bmatrix} = |Xh| \leq u$$

Equation 6 where:

$$X = \begin{bmatrix} x_1 & 0 & \cdots & & \\ x_2 & x_1 & 0 & \cdots & \\ x_3 & x_2 & x_1 & 0 & \cdot \\ 0 & [x] & 0 & & \\ 0 & 0 & 0 & \cdot & x_M \end{bmatrix}$$

Equation 7 and;

$$u = \begin{bmatrix} 1 \\ 1 \\ \cdot \\ \cdot \\ 1 \end{bmatrix}$$

Equation 8

The problem as now posed is very similar to the general problem of linear programming. It differs from the classical problem in that $h$ is not required to be an always positive vector.

The set of linear inequalities in Equation 6 can be written as a set of $2(M+N-2)$ equalities in $k = 2M + 3N - 4$ variables: $h_1, \ldots, h_k$; where the last $2(M+N-2)$ variables must always be positive. This leads to the set of constraints:

$$Ah = v$$

Equation 9 where, $$A = \begin{bmatrix} XI & 0 \\ 0 & I & I \end{bmatrix}$$

$$I = \left.\begin{bmatrix} 1 & & 0 \\ & \cdot & \\ & & \cdot \\ 0 & & 1 \end{bmatrix}\right\} M+N-2$$

$$\underbrace{\phantom{xxxxxx}}_{M+N-2}$$

Equation 10 and, $$h = \begin{bmatrix} h_1 \\ \cdot \\ \cdot \\ \cdot \\ h_N \\ h_{N+1} \\ \cdot \\ \cdot \\ h_{2(M+N-2)} \end{bmatrix}$$

Equation 11 and, $$v = \begin{bmatrix} 1 \\ 1 \\ \cdot \\ \cdot \\ \cdot \\ 1 \\ 2 \\ 2 \\ \cdot \\ \cdot \\ \cdot \\ 2 \end{bmatrix} \begin{matrix} \}M+N-2 \\ \\ \\ \\ \\ \}M+N-2 \end{matrix}$$

Equation 12

This problem can be readily solved by an extension of Dantzig's simplex method. Reference is had to the text Linear Programming, Methods and Applications, by Saul I. Goss, McGraw-Hill Book Company, 1958, page 50, chapter 4, for a discussion of the simplex method for solving such problems. The results of the extended simplex technique as applied to the above problem for a rectangular pulse sensor output function are summarized in the following Tables I through V, where $\Delta$ is the desired system output pulse width, HR is the ratio of filter peak signal output to filter peak spurious output, RI is the resolution improvement ratio or ratio of input pulse width to output pulse width and each row of dots (. . .) represents RI-2 zeros.

The invention and the use of these tables and their significance will be more readily understood in connection with the following description taken in connection with the accompanying drawings in which.

Figure 1:
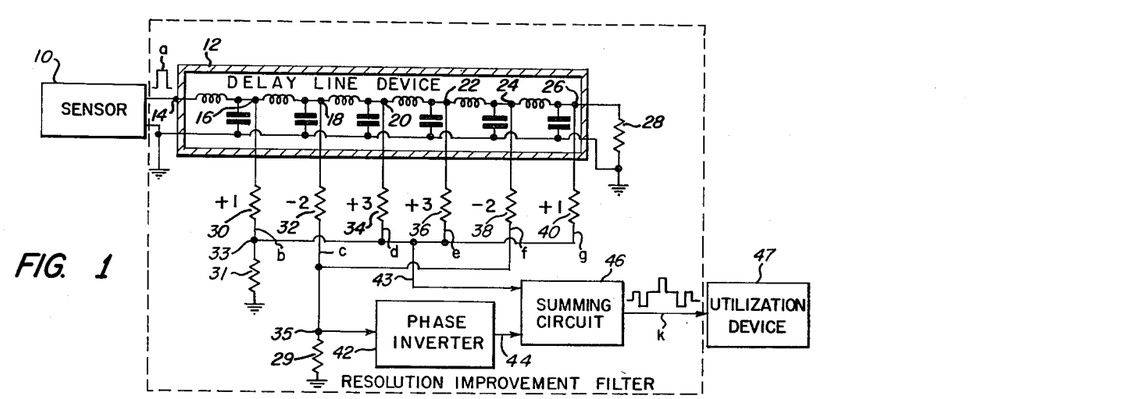
FIG. 1 is a block and circuit diagram of the resolution device for one embodiment of the invention.

Reference is had now to FIG. 1, wherein is shown one embodiment of the present invention in partial schematic form and which will now be described with the aid of the accompanying waveform tabulation of FIG. 2. In the embodiment of FIG. 1 a linear sensor 10 which may be, for example, the receiver of a radar, sonar or other detection device has an impulse response, for example, which is a rectangular pulse signal shown as curve $a$ of FIG. 2. The rectangular pulse $a$ starts at some time $t_0$ and terminates at $t_1$.

It should be emphasized here that although a rectangular pulse sensor output is assumed for the sensor response in this particular embodiment, numerous other wave shapes such as a sin $x/x$ function, an exponential waveform or other shape can be suitably resolved by utilizing the equation for each of said waveshapes as the function

RESOLUTION IMPROVEMENT

| Desired Hash Ratio | Delay Line Length | Tap Weighting Values |
|---|---|---|
| TABLE I (RI=2) | | |
| 2 | 2Δ | 1 1 |
| 4 | 4Δ | −1 2 2 −1 |
| 6 | 6Δ | 1 −2 3 3 −2 1 |
| 8 | 8Δ | −1 2 −3 4 4 −3 2 −1 |
| 10 | 8Δ | 1 −2 3 −4 5 5 −4 3 −2 1 |
| TABLE II (RI=3) | | |
| 2 | 3Δ | 1 0 1 |
| 4 | 5Δ | −1 2 0 2 −1 |
| 5 | 7Δ | 1 −2 2 1 2 −2 1 |
| 6 | 9Δ | 1 0 −2 3 0 3 −2 0 1 |
| 8 | 11Δ | −1 2 0 −3 4 0 4 −3 0 2 −1 |
| 9 | 13Δ | 1 −2 2 1 −4 4 1 4 −4 1 2 −2 1 |
| 10 | 15Δ | 1 0 −2 3 0 −4 5 0 5 −4 0 3 −2 0 1 |
| TABLE III (RI=4) | | |
| 2 | 4Δ | 1 0 0 1 |
| 4 | 6Δ | −1 2 0 0 2 −1 |
| 6 | 12Δ | 1 0 0 −2 3 0 0 3 −2 0 0 1 |
| 8 | 14Δ | −1 2 0 0 −3 4 0 0 4 −3 0 0 2 −1 |
| 10 | 20Δ | 1 0 0 −2 3 0 0 −4 5 0 0 5 −4 0 0 3 −2 0 0 1 |
| TABLE IV (RI=5) | | |
| 2 | 2Δ | 1 0 0 0 1 |
| 4 | 7Δ | −1 2 0 0 0 2 −1 |
| 5 | 11Δ | 1 0 −2 2 0 1 0 2 −2 0 1 |
| 6 | 15Δ | 1 0 0 0 −2 3 0 0 0 3 −2 0 0 0 1 |
| 8 | 17Δ | −1 2 0 0 0 −3 4 0 0 0 0 4 −3 0 0 0 2 −1 |
| 10 | 25Δ | 1 0 0 0 −2 3 0 0 0 −4 5 0 0 0 0 5 −4 0 0 0 3 −2 0 0 0 1 |
| TABLE V | | |
| 2 | RIΔ | 1 . . . 1* |
| 4 | [RI+2]Δ | −1 2 . . . 2 −1 |
| 6 | [3RI]Δ | 1 . . . −2 3 . . . 3 −2 . . . 1 |
| 8 | [3RI+2]Δ | −1 2 . . . −3 4 . . . 4 −3 . . . 2 −1 |
| 10 | [5RI]Δ | 1 . . . −2 3 . . . −4 5 . . . 5 −4 . . . 3 −2 . . . 1 |
| 12 | [5RI+2]Δ | −1 2 . . . −3 4 . . . −5 6 . . . 6 −5 . . . 4 −3 . . . 2 −1 |
| 14 | [7RI]Δ | 1 . . . −2 3 . . . −4 5 . . . −6 7 . . . 7 −6 . . . 5 −4 . . . 3 −2 . . . 1 |

*Each row of dots represents RI−1 zeros.

X in previously noted Equation 5 and solving for the values of $h$ by the Danzig simplex method as was done for the rectangular pulse function whose solution is tabulated in Tables I through V.

The signal of curve $a$ from sensor 10 may, for example, correspond to the envelope of a pulse echo return from an individual radar target. This signal is coupled to input terminal 14 of delay line device 12 represented here as a delay network, comprising a plurality of series connected inductors and shunt connected capacitors arranged to form individual sections of units. Six equally spaced taps, 16, 18, 20, 22, 24 and 26 spaced uniformly across the network of delay line 12 are provided for tapping off portions of the incoming signal at successively greater time delay intervals. An impedance matching resistor 28 is provided at the end of the line to prevent undesired reflections of the input signal. The relative amplitudes of the delayed signals tapped from each section is established by the relative weighting value or in this case resistance value of each tap resistor 30, 32, 34, 36, 38 and 40. As can be seen, tap resistors 30, 34, 36 and 40 are coupled through common resistor 31 to ground. Likewise, resistors 32 and 38 are coupled through common resistor 29 to ground. Junctions 33 and 35 of common resistors 31 and 29 with their respective tapping resistors are provided from which connection is made either to phase inverter 42 or directly to summing circuit 46. Thus, the combination of common resistors 31 and 29 with their respective tap resistors provides a voltage dividing network from which successively delayed portions of the input signal can be tapped off the delay line, said portions having relative amplitudes corresponding to the predetermined weighting scheme arrangement. The polarity of the delayed signals from junction 35 is reversed by coupling said junction to phase inverter 42. Phase inverter 42 inverts the phase of the input signals to it, prior to combining all the delayed signals in summing circuit 46. Thus, for example, all the signals present on line 44 will linearly subtract from those present in line 43 when combined in summing circuit 46. The total effect of combining the delayed signals in different proportions and in different polarities is denoted by the term "weighting" the delay line.

The resultant composite signal, produced by combining the various time delayed and weighted signals in summing circuit 46, is coupled to a suitable utilization device 47 which may include in the case of a radar range resolution system well known video amplifier stages, and sweep intensifying circuits and ultimately a cathode ray tube display device.

Figure 2:
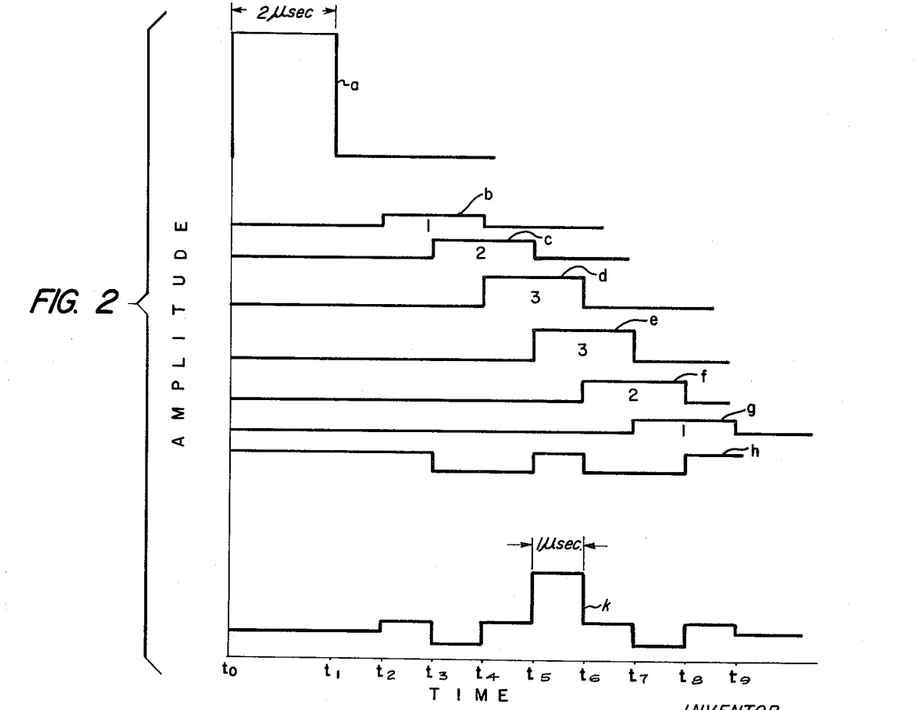
FIGS. 2 and 3 are graphs that are referred to in explaining the operation of the device shown in FIG. 1.

For purposes of illustrating the particular embodiment shown in FIG. 1, a rectangular pulse input of idealized shape shown in curve $a$ of FIG. 2 is chosen. It is assumed that a hash ratio (HR) of 6:1 and a resolution improvement (RI) of 2:1 is desired. Thus, in accordance with the invention, Table I line 3 of the aforementioned tables specifies the optimum tap weighting values to assign to each tap, as well as the minimum delay line length required to achieve the desired results. Accordingly, the respective weighted values of impedance elements 30, 32, 34, 36, 38 and 40 are selected so that the voltage tapped off at each tap as curve $a$ passes through the delay line is of relative amplitude ratio as seen at junctions 33 and 35 are 1, 2, 3, 3, 2 and 1, respectively. Assuming the sensor output signal is two microseconds wide, then for a 2:1 resolution improvement the system output must be 1 microsecond wide. The delay $\Delta$ or interval between $t_2$ and $t_3$ and $t_5$, etc., of FIG. 2 is then made equal to 1 microsecond. Hence, the over-all delay line length can be seen to be equal to $6\Delta$ or 6 microseconds as specified in Table I.

The individual waveforms obtained at each tap as the sensor signal $a$ travels down the delay device 12 are ideally represented by the waveforms of curves $b$ through $g$. Thus, the signal represented by curve $b$, since it is taken from the first tap 16, is delayed one $\Delta$ or 1 microsecond in this case from the undelayed original signal $a$. The amplitude of the signal is one-half the value of signal $c$ and one-third the value of signal $d$ in accordance with the weighting values specified in Table I and physically realized by making the resistance value of impedance element 30 of sufficient value that the voltage value tapped off at junction 33 as pulse $a$ passes tap 16 is ½ the value of the voltage tapped off at junction 35 when pulse $a$ passes tap 18 and ⅓ the value of that tapped off taps 20 and 22. Where common resistors 31 and 29 are sufficiently low in value, the relative impedances of resistors 30, 32, 34, 36, 38 and 40 approximate the inverse of the tap weighting values specified in the aforementioned Tables I–V.

Curve $h$ represents the signals from taps 18 and 24 after having been phase inverted by passage through well known phase inverter device 42.

Signals $b$, $d$, $e$, $g$ and $h$ are summed in a linear manner in summing circuit 46 to form the composite signal $k$. As can be seen, the signal $k$ has a peak amplitude between $t_5$ and $t_6$ which is of a magnitude six times greater than the next highest peak, between $t_4$ and $t_5$. The hash ratio attained by definition is then 6:1. Furthermore, the resultant signal $k$ has a pulse width at the peak of $t_5-t_6$ which equals $\Delta$ and is one-half the width of the input signal. Hence, the desired resolution improvement of 2:1 has also been achieved in accordance with this invention.

By adding more delay lines and weighting the taps as shown in Table I the hash ratio can be increased. Alternatively, it might be desired to achieve greater than 2:1 resolution improvement. It would then be necessary, for example, to use the weighting values of Table II for a 3:1 ratio or Table III for a 4:1 ratio.

It is also possible to achieve weighting of the individual subpulses denoted as curves $b$ through $g$ by means of a phase shifting network either built into the delay line networks or coupled to each tap. The phase shifting device compares the phase of the subpulse with a reference signal and shifts the phase of each subpulse according to the predetermined weighting scheme so as to produce subpulses substantially the same as those shown in curves $b$ through $g$ except that the polarity reversal required of curves $c$ and $f$ could be made by the phase shifting device without the necessity for a further polarity change in phase inverter 42.

Figure 3:
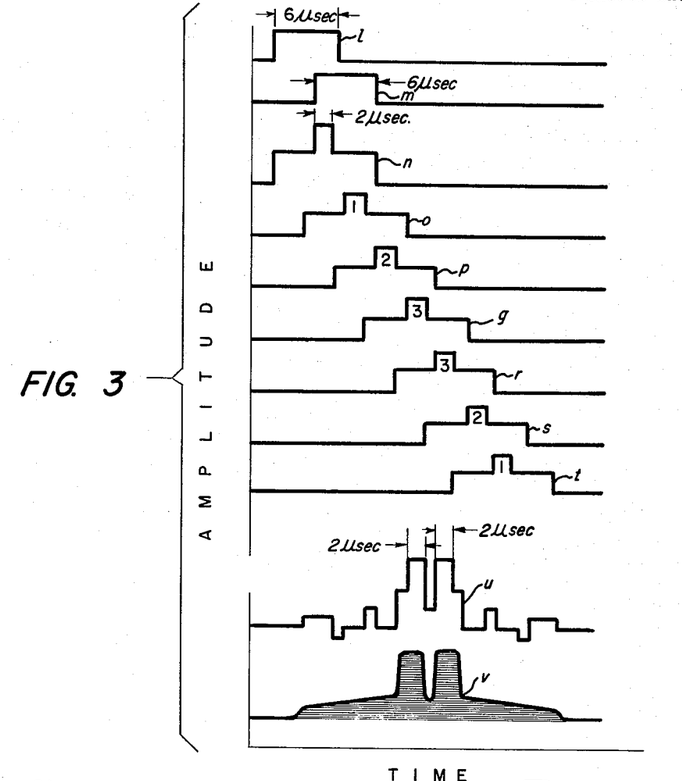

The graph of FIG. 3 illustrates the fact that the present device of FIG. 1 can be used to resolve two signals overlapping in time by resolving the signals by a factor greater than the overlap period. For example, assume two signals $l$ and $m$ of FIG. 3, each of pulse duration 6 microseconds long which overlap by 2 microseconds as shown. The signal resulting from the overlap of $l$ and $m$, assuming an in-phase condition for the sake of simplification, would be as shown on curve $n$. Passing this composite signal through the delay line device 12 of FIG. 1, which device is unchanged from the previous description except that the delay between each tap is now made equal to 3 microseconds, results in the six signals represented by curves $o$, $p$, $q$, $r$, $s$ and $t$ of FIG. 3. Each curve is of relative individual amplitude denoted by the numeral within the individual curve. Coupling signals $p$ and $s$ to phase inverter 42 and summing the remaining signals in circuit 46 with the output of the phase inverter results in the composite signal of curve $u$, which contains the desired dual peak characteristics denoting the presence of two signals. Since various in-phase or out-of-phase conditions may exist between the two signals $l$ and $m$ and tolerances of the delay line components would in practice introduce small errors, the composite signal for many repetitions of the same overlapped signals in differing phase relationships as viewed for example on a high persistency scope would more closely approximate the form of curve $v$ where negative going waves have been clipped after summing in the summing circuit. Of course, as related before, the degree of resolution improvement and hash ratio desired can be increased by a suitable arrangement of weighted taps selected from Tables I–V.

A typical application of the device embodied in FIG. 1 would be in obtaining improved range resolution or discrimination between closely spaced radar range targets. A suitable system for performing this function is illustrated in block diagram form in FIG. 4.

Figure 4:
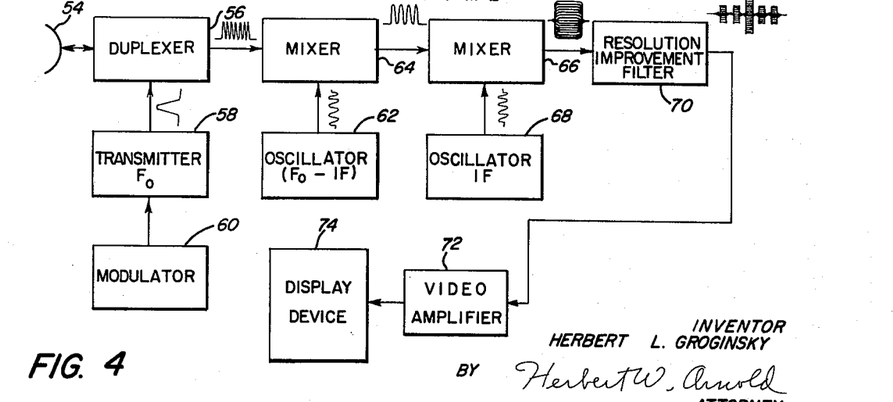
FIG. 4 is a block diagram of a system embodiment of the resolution improvement device.

As can be seen in FIG. 4, a standard radar transmitter 58 is shown which transmits a radio frequency signal at a frequency $F_0$ which is amplitude modulated by modulator 60 to form a pulsed transmitted signal which is then coupled to propagating antenna 54 by means of well known duplexing device 56. The echo signal produced by objects in the path of the transmitted signal is collected by antenna 54 and coupled to the radar receiver apparatus or sensor means through said duplexer 56.

The sensor means comprises mixers 64 and 66 and oscillators 62 and 68. The first mixer 64 translates the original radio frequency $F_0$ of the echo signal to a convenient intermediate frequency IF by beating $F_0$ with the signal $F_0$—IF from oscillator 62 in the well known manner in mixer 64 and filtering out the unwanted side products of the mixing process.

Suitable amplification stages may be introduced at this point between elements 64 and 66 as desired. The second mixer 66 acts in effect as a phase detector. The IF signal from mixer 64 is now beat in mixer 66 with an IF signal from oscillator 68. Since the two signals are at the same frequency, the resultant signal output will vary in amplitude according to the relative phase differences between the two signals; however, the wave shape will remain proportional to the envelope of the RF echo signal.

The output of the second mixer 66 is coupled to a resolution improvement filter 70 which comprises a delay line, suitable tapping resistors, a phase inverter and summing means such as that depicted in FIG. 1.

In practice, the particular configuration of the filter delay length and tap weighting values would be established by first operating the radar device without the resolution improvement filter to determine the impulse response of the sensor. The antenna 54 is focused on a particular distinct individual target and the output of the second mixer 66 displayed on a cathode ray tube to determine the impulse response of the sensor means. If the response is, for example, a rectangular pulse of pulse width 6 microseconds long, such as that of curve $l$, FIG. 3, a 2:1 resolution improvement is obtained by using the tap weighting sequence and delay line length described in connection with FIG. 3 and wherein the total delay line length is equal to 18 microseconds and the 1st, 2nd, 3rd, 4th, 5th and 6th taps have relative weighting values of +1, −2, +3, +3, −2 and +1 respectively.

The resolution improvement filter 70, utilizing the tap weighting values noted above resolves the output of mixer 66 by a factor of 2 and provides discrimination between closely spaced targets having an overlap ratio of less than 2:1. The resolved signal output from filter 70 may then be coupled to well known video amplifier 72 for suitable amplification of the signal prior to presentation on display device 74.

Display device 74 may be any suitable display apparatus such as the well known A, B and PPI cathode ray tube scope presentations or could be a storage tube or other display device. Since the output of resolution improvement filter 70 is a bipolar video signal, suitable limiters or clippers may be added in the circuit after the filter 70 where bipolar presentation is not desired or required.

A variation of the embodiment disclosed in FIG. 4 is to place the resolution improvement filter 70 at the output of the first detector 64 and resolve at the IF frequency, in which case the delay line filter would be identical to the corresponding filter at the output of the second detector 66 except that the spacing between taps is more critical in the former, requiring tap spacings at integral multiples of the IF wave period.

A still further modification of the embodiment of FIG. 4 entails placement of the resolution improvement filter 64 at the output of the duplexer, in which case the delay line must be capable of linearly delaying the high frequency signal $F_0$ reflected from targets in the path of the transmitted signal.

A suitable extension of the embodiment of FIG. 4 for moving target indicator operation requires phase coherence between oscillator 68 and the transmitted signal $F_0$. Such a system is shown in the text Electronic and Radio Engineering, by Terman, published by McGraw-Hill, 4th Edition, 1955, pages 1033 through 1036 and FIGS. 26–15 and 26–16, and incorporated herein by reference.

In such a system the resolution improvement filter 70 is placed either after the phase detector of FIG. 26–16, in which case signals from moving targets as well as stationary targets would be resolved, or after the subtracting circuit of FIG. 26–16, in which case only moving target signals would be resolved. Also, in order to maintain linearity of the system and obtain superposition of signals the limiter of FIG. 26–16 of the referenced text would have to be removed and bypassed.

Figure 5:
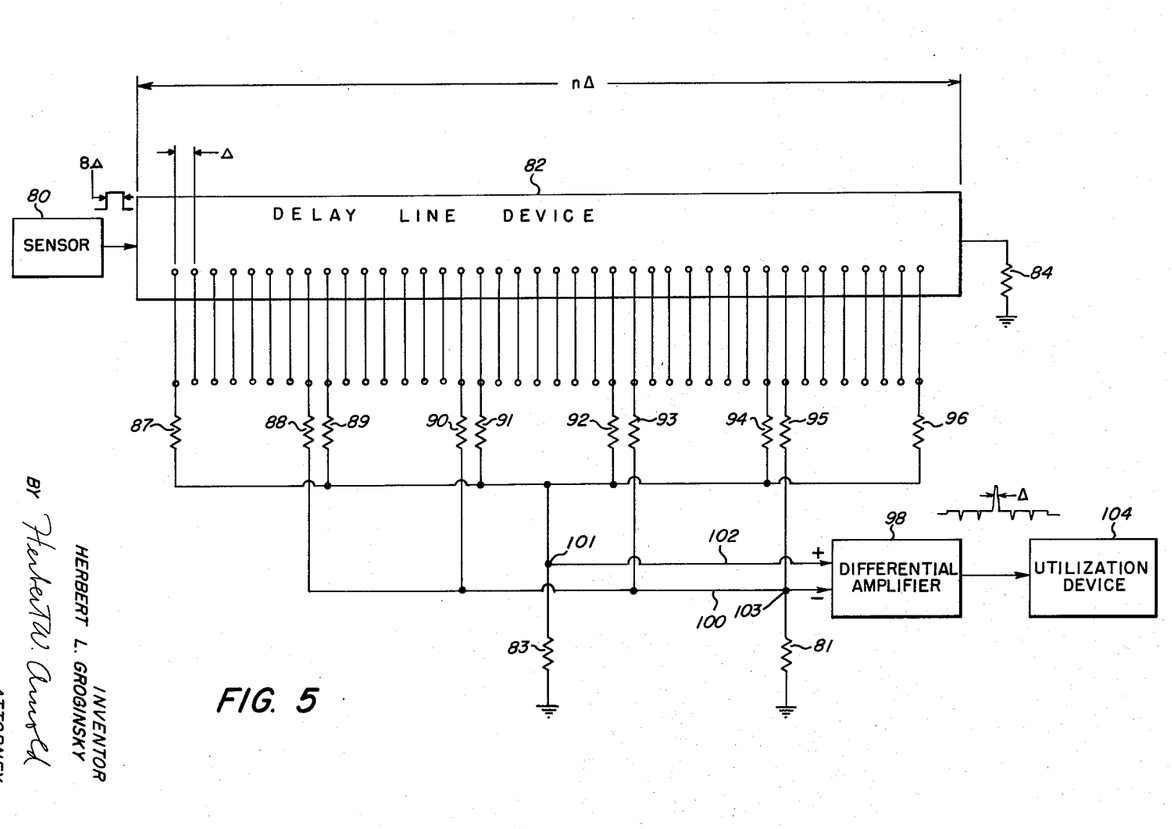
FIG. 5 is a specific detailed embodiment of the resolution improvement device which is used to show the significance of aforementioned Table V.
Figure 6:
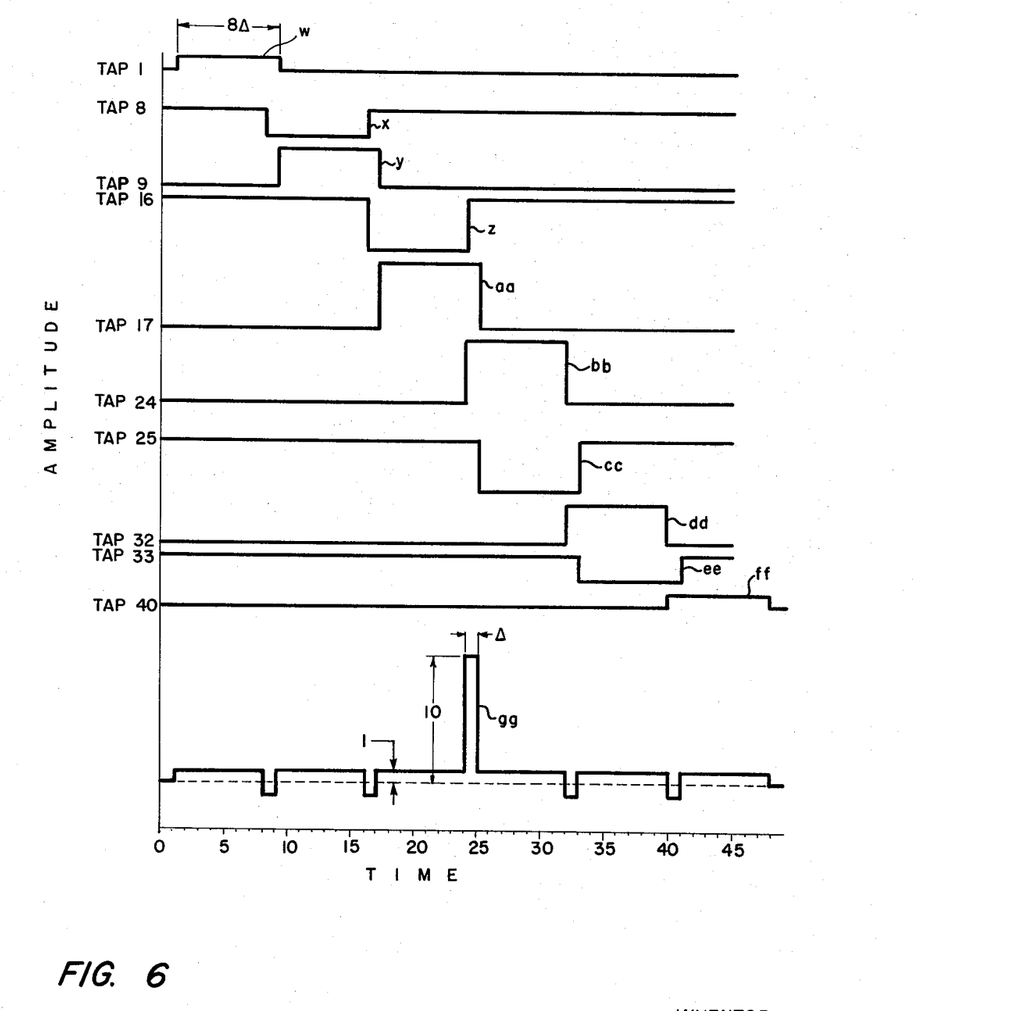
FIG. 6 is a graph that is referred to in explaining the operation of the invention embodied in FIG. 5.

The system illustrated in FIG. 5 and the graph of FIG. 6 is presented here to explain in greater detail the method of utilizing the aforementioned Table V and to present some representative actual values of the tap weighting resistor values. In this particular embodiment of FIG. 5 a signal output from sensor 80 is assumed to be a 2 microsecond rectangular pulse of arbitrary amplitude. It is also assumed, for example, that it is desired to achieve a resolution improvement of 8:1 and a hash ratio of 10:1. Referring now to Table V, it can be seen that for a desired hash ratio of 10, the total delay line length must be made equal to 5 times the resolution improvement ratio RI, times the desired output pulse width Δ. In this example, the total delay line length is then 5×8×.25 microseconds or 10 microseconds.

Furthermore, in accordance with the weighting plan of Table V it is required that there be a tap weighting arrangement at each successive tap corresponding to the arrangement of 1 . . . 23 . . . 45 . . . 54 . . . 32 . . . 1. Thus, we see that 40 taps of equal spacing, .25 microsecond, apart are required to be weighted in accordance with the formula of Table V for this example.

Accordingly, the delay line device 82 of FIG. 5 is comprised of a series of 40 delay networks such as those described in connection with FIG. 1 but not shown here other than by reference to the 40 taps shown extending out of said delay line, said taps each being connected at the junctures of each successive delay line network. The electrical spacing between each tap is predetermined in accordance with Chart V and the supposed present input rectangular pulse signal of 2 microseconds from sensor 80. For the present example, this spacing is .25 microsecond. Impedance matching resistor 84 is coupled to the end of said delay line device 82. Common resistors 83 and 81 provide voltage divider networks at junctions 101 and 103 respectively, with tap resistors 87, 89, 91, 92, 94, 96 and tap resistors 88, 90, 93, 95 respectively. Junctions 101 and 103 are connected to opposite sides of differential amplifier for linear summing of the signals present on lines 102 and 100.

Impedance elements 87 through 96 are coupled to the 1st, 8th, 9th, 16th, 17th, 24th, 25th, 32nd, 33rd and 40th taps respectively. Each impedance element bears a relative value of impedance with respect to each other element in accordance with the aforesaid formula from Table V of 1, 2, 3, 4, 5, 5, 4, 3, 2 and 1 respectively. Thus, for example, the subpulse output from the first tap will be proportional to one-half of the amplitude of the subpulse from the 8th tap and one-third of the amplitude of the subpulse from the 9th tap, etc. The taps for which, in accordance with Table V, zero tap weighting values are assigned, are left uncoupled as shown in FIG. 5.

The outputs from each individual tap bearing an impedance element are shown in FIG. 6 wherein; curve $w$ represents a time versus amplitude plot of the output subpulse from the first tap, curve $x$ represents the output subpulse from the 8th tap, curve $y$ the output from the 9th tap, curve $z$ the output from the 16th tap, curve $aa$ the output from the 17th tap, curve $bb$ the output from the 24th tap, curve $cc$ the output from the 25th tap, curve $dd$ the output from the 32nd tap, curve $ee$ the output from 33rd tap and curve $ff$ the output from the 10th tap. It should be noted that curves $x$, $z$, $cc$ and $ee$ have been phase inverted to denote the effect of summing these signals on the negative side of differential amplifier 98 by means of summing buss 100; whereas the remaining impedance bearing taps are connected to summing buss 102 and thereby connected to the positive input of well known differential amplifier 98. The time on FIG. 6 represents the starting time at which the 2 microsecond pulse from sensor 80 enters the delay line. Also, the first index on the time scale represents the time at which the delayed sub-pulse $w$ from the first tap occurs. The interval between each index on the time scale is equal to $\Delta$ or in this case .25 microsecond.

The resultant composite signal which occurs at the output of differential amplifier 98 upon linearly adding in a algebraic manner in differential amplifier 98 the signals present on lines 102 and 100 is shown on FIG. 6 as curve $gg$.

As can be seen, curve $gg$ has a peak amplitude between the 24th and 25th index which is 10 times as large as the highest side-lobe level. Thus, the desired hash ratio of 10:1 has been achieved. Furthermore, the interval between the 24th and 25th index, which corresponds to the delay time between each tap, is .25 microsecond long.

Accordingly, the 2 microsecond input signal from sensor 80 has been resolved to a .25 microsecond signal out of the differential amplifier 98. Thus, the desired resolution improvement ratio RI of 8:1 has also been achieved in accordance with Table V of this invention.

The actual signal viewed at the output of differential amplifier 98 is shown as curve $hh$ of FIG. 5. As can be seen, the curve $hh$ has a more rounded appearance than curve $gg$ of FIG. 6 due to the non-realizeability of zero rise time rectangular pulse inputs and because of the finite bandwidth of the delay line.

The following Table VI summarizes the resistor values of each impedance element used in the device of FIG. 5 to produce the specified resolution improvement ratio and hash ratio of 8:1 and 10:1 respectively. These values also take into account losses in the delay line itself.

TABLE VI

| Impedance element: Tap resistors— | Calculated value in ohms |
|---|---|
| 87 | 6800 |
| 88 | 3430 |
| 89 | 2090 |
| 90 | 1530 |
| 91 | 1160 |
| 92 | 1085 |
| 93 | 1460 |
| 94 | 1680 |
| 95 | 2700 |
| 96 | 4640 |
| Matching resistors— | |
| 83 | 75 |
| 84 | 75 |
| 81 | 75 |

The delay line device 82 consisted of five 5775D Ad-Yu Electronics Lab., Inc. tapped delay lines. A Textronix Wide Band Differential Amplifier, Type G, was used as element 98.

This completes the description of the preferred embodiment of the invention. However, many modifications of the invention will be apparent to those skilled in the art.

For example, in order to insure an output pulse of some magnitude at all times for sensed recurrent echo pulses coupled to resolution improvement filter 70 of FIG. 4, it is only necessary to add a second IF oscillator similar to oscillator 68 but offset in phase 90 degrees from oscillator 68. The second oscillator could then be mixed with the output of mixer 64 and the resultant signal fed to a parallel resolution improvement filter.

Accordingly, it is desired that this invention not be limited except as defined by the appended claims.

What is claimed is:

1. A resolution improvement device comprising:
   means for successively time delaying signals from a sensor;
   a time interval $\Delta t$ which is less than the pulse width of the signal delayed;
   means coupled to said time delaying means for deriving a plurality of said successively time delayed signals, said signals being of relative amplitude and phase in accordance with a weighting scheme pre-established by the impulse response of said sensor wherein at least one of said delayed signals is weighted by a greater amount than at least one other;
   means for combining said plurality of signals to derive an output signal having a peak amplitude in a relatively narrow time interval with respect to said sensor signals;
   and means coupled to said combining means for utilizing said output signals.

2. A resolution improvement device comprising:
   means for successively time delaying signals from a sensor;
   a time interval $\Delta t$ which is less than the pulse width of the signal delayed;
   means connected to said delaying means for deriving a plurality of said successively time delayed signals including a plurality of pairs of said signals, said signals being of relative amplitude and phase in accordance with a weighting scheme pre-established by the impulse response of said sensor wherein each of said delayed signals in a pair is weighted by the same amount and at least one of said pairs is weighted by a greater amount than at least one other pair;
   means for combining said plurality of signals to derive an output signal, said output signal being characterized by a relatively narrow peak amplitude as compared to the sensed signal;
   and means coupled to said combining means for utilizing said output signals.

3. A resolution improvement device comprising:
   means for sensing signals;
   means coupled to said sensor means for successively time delaying said sensed signals;
   a time interval $\Delta t$ which is less than the pulse width of the signal delayed;
   means connected to said time delaying means for deriving a plurality of said successively time delayed signals including a plurality of pairs of said signals, said signals being of relative amplitude and phase in accordance with a weighting scheme pre-established by the impulse response of said sensor means wherein each one of said delayed signals in a pair is weighted by the same amount and each pair is weighted by a different amount;
   and means for combining said plurality of signals to derive an output signal, said output signal being characterized by a high peak amplitude during a relatively short time interval and a relatively low amplitude signal during the remaining time intervals.

4. A resolution improvement device comprising:
   delay means for progressively delaying a signal;

a time interval Δ*t* which is less than the pulse width of the signal delayed;

a plurality of impedance means coupled to said delay means for tapping off progressively delayed portions of said signal, at least one of said impedance means being weighted differently than at least one of the other impedance means;

inverter means coupled to at least one of said impedance means for phase inverting at least one of said portions;

and means for summing said inverter means signal portions with the remaining progressively delayed signal portions to produce a relatively narrow composite signal.

5. A resolution improvement device for producing in response to an input signal an output signal having a peak amplitude in a relatively narrow time interval with respect to said input signal, comprising:

time delay means for progressively time delaying an input signal, said time delay means having spaced taps of spacing less than the width of said input signal but equal to said peak output signal pulse width and having a total delay time greater than the input signal width;

weighting means coupled to each of said taps including first and second equivalent pluralities, the value and polarity of each of said weighting means being a predetermined function of the input signal wave shape such that each weighting means in one of said pluralities has a different integral value of the same weighting factor;

and combining means for summing the outputs of each of said taps to produce a composite signal having a relatively high peak amplitude in a single narrow time interval and a relatively low amplitude in the remaining time intervals.

6. A resolution improvement device capable of separating overlapping pulse echo signals, comprising:

means for detecting recurrent pulse echo signals some overlapping in time;

means connected to said detector for time delaying said pulse echo signals from said detector a plurality of fixed predetermined time intervals less than the pulse width of said pulse echo signals;

a plurality of weighting means elements spaced at predetermined intervals along said time delaying means and of fixed predetermined value, at least one of said weighting elements having a greater value than at least one other, and each of said weighting means elements thereby deriving from said time delaying means portions of said recurrent pulse echo signals of a phase and amplitude predetermined by the impulse response of said detector;

and means for combining said derived signals to produce a composite signal for each of said echo signals having a peak signal amplitude contained in a relatively narrow time interval, all of said peak signals being in spaced-apart relationship.

7. A resolution improvement device responsive to echo signals for producing output signals having peak amplitudes with relatively narrow widths with respect to said echo signals, comprising:

means for sensing the echo signals produced by reflections of transmitted electromagnetic energy from target objects;

delay means connected to said sensing means for progressively time delaying said sensed signals, said delay means having spaced taps of spacing equal to said output signal pulse width from an individual target;

fixed weighting means coupled to each of said taps, the value and polarity of each of said weighting means being a predetermined function of the sensor response from an individual target wherein at least one of said weighting means has a value greater than at least one other;

and combining means coupled to said weighting means for summing the outputs of each of said weighting means to produce a relatively narrow composite output signal.

References Cited by the Examiner

UNITED STATES PATENTS

| | | | |
|---|---|---|---|
| 2,421,340 | 5/1947 | Levy | 343—17.1 |
| 2,677,128 | 4/1954 | Spaulding | 343—17.1 |
| 2,678,997 | 5/1954 | Darlington. | |
| 2,801,351 | 7/1957 | Calvert et al. | 235—181 |
| 2,927,303 | 3/1960 | Elbinger. | |
| 3,090,953 | 5/1963 | Frank | 343—17.1 |
| 3,114,132 | 12/1963 | Trimble | 340—146.3 |

CHESTER L. JUSTUS, *Primary Examiner.*